(12) United States Patent
Ceekala et al.

(10) Patent No.: US 11,627,305 B2
(45) Date of Patent: Apr. 11, 2023

(54) FROZEN IMAGE DETECTION (71) Applicant: TEXAS INSTRUMENTS INCORPORATED, Dallas, TX (US)

(72) Inventors: Vijaya Ceekala, San Jose, CA (US); Xin Liu, Saratoga, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/245,394

(22) Filed: Apr. 30, 2021

(65) Prior Publication Data

US 2022/0353491 A1  Nov. 3, 2022

(51) Int. Cl.
*H04N 7/18* (2006.01)
*H04N 17/04* (2006.01)
*G06T 7/00* (2017.01)

(52) U.S. Cl.
CPC ........... *H04N 17/04* (2013.01); *G06T 7/0002* (2013.01); *G06T 2207/10016* (2013.01)

(58) Field of Classification Search
CPC ........ H04N 17/04; H04N 7/18; G06T 7/0002; G06T 2207/10016
USPC .................................................. 348/180, 148
See application file for complete search history.

(56) References Cited

U.S. PATENT DOCUMENTS

| | | | | |
|---|---|---|---|---|
| 6,377,297 B1* | 4/2002 | Janko | ..................... | H04N 19/85 348/700 |
| 8,165,226 B2* | 4/2012 | Schnebly | ............... | H04N 7/183 348/715 |
| 8,564,669 B2* | 10/2013 | Seigneurbieux | ....... | H04N 19/85 348/180 |
| 9,826,252 B2* | 11/2017 | Wendel | ................. | H04N 19/89 |
| 11,012,637 B2* | 5/2021 | Al Ani | .................... | H04N 5/265 |
| 2016/0358312 A1* | 12/2016 | Kolb, V | .................. | G06T 5/003 |
| 2020/0120332 A1* | 4/2020 | Julve | .................... | H04N 5/2256 |
| 2021/0136358 A1* | 5/2021 | Nandan | .................. | H04N 7/183 |

* cited by examiner

*Primary Examiner* — Trang U Tran
(74) *Attorney, Agent, or Firm* — John R. Pessetto; Frank D. Cimino (57) ABSTRACT

Aspects of the disclosure provide for a method. In some examples, the method includes receiving a video stream comprising multiple frames, analyzing the video stream to compare data values representing an image pixel at a specified location in a first of the frames to data values representing an image pixel at the specified location in a second of the frames, determining that the video stream is frozen responsive to the data values representing the image pixel at the specified location in the first of the frames being the same as the data values representing the image pixel at the specified location in the second of the frames, and taking action responsive to determining that the video stream is frozen.

13 Claims, 3 Drawing Sheets

FROZEN IMAGE DETECTION

BACKGROUND

Various electronic systems receive video streams. The video streams may be camera outputs, sensor outputs, generated video, video for a dashboard or user interface, etc. Sometimes, errors occur in transmission of the video streams so that the video streams become frozen.

SUMMARY

Aspects of the disclosure provide for a circuit. In at least some examples, the circuit includes a memory and a processor coupled to the memory. The processor is configured to receive a data stream comprising a video that comprises multiple image frames, compare data values representing an image pixel at a specified location in a first of the image frames to data values representing an image pixel at the specified location in a second of the image frames, determine that the video is frozen responsive to the data values representing the image pixel at the specified location in the first of the image frames being the same as the data values representing the image pixel at the specified location in the second of the image frames, and determine that the video is not frozen responsive to the data values representing the image pixel at the specified location in the first of the image frames being different from the data values representing the image pixel at the specified location in the second of the image frames.

Other aspects of the disclosure provide for a system. In some examples, the system includes a headunit, a multistream generator, and a frozen image detector. The head unit is adapted to generate at least two video streams each comprising multiple frames. The multistream generator is coupled to the head unit and configured to generate an output of the multistream generator having encoded packets that include information from the at least two video streams. The a frozen image detector is configured to receive the output of the multistream generator, analyze the output of the multistream generator to compare data values representing an image pixel at a specified location in a first of the frames to data values representing an image pixel at the specified location in a second of the image frames, and determine that at least one of the video streams is frozen responsive to the data values representing the image pixel at the specified location in the first of the frames being the same as the data values representing the image pixel at the specified location in the second of the image frames.

Other aspects of the disclosure provide for a method. In some examples, the method includes receiving a video stream comprising multiple frames, analyzing the video stream to compare data values representing an image pixel at a specified location in a first of the frames to data values representing an image pixel at the specified location in a second of the frames, determining that the video stream is frozen responsive to the data values representing the image pixel at the specified location in the first of the frames being the same as the data values representing the image pixel at the specified location in the second of the frames, and taking action responsive to determining that the video stream is frozen.

BRIEF DESCRIPTION OF THE DRAWINGS

The same reference numbers (or other feature designators) are used in the drawings to designate the same or similar (functionally and/or structurally) features.

DETAILED DESCRIPTION

Various electronic systems employ components coupled together to comprise the system. As the functionality of the system increases, the complexities of the interconnections increase. As more functionality is added to the system (e.g., in response to increased integration and processing power), the numbers of terminals of the connectors increase, which, in turn, increase the size, complexity, and/or cost of the connectors.

Some electronic systems are installed in a transportation platform (such as an airplane or motor vehicle). Limitations in the structure of the mobile platform (e.g., due to human factors, safety considerations, and aerodynamic performance) sometimes limit the space otherwise afforded to the connectors and cabling of an electronic system. Further, access to the connectors and cabling (e.g., for testing, replacement, and/or repair) is sometimes limited, such as if the electronic system is installed in a dashboard that, in some implementations, includes an airbag, of a vehicle or other components that reduce the space available for routing connectors and/or cabling.

An example of an electronic system that can be installed in a vehicle platform is an "infotainment" system, in which video data can be generated by (or otherwise transmitted by) a control unit (e.g., a head unit or other data source). The generated video data can be transferred to multiple display panels (e.g., a heads-up display, an instrument cluster, and a center-instrument display). To send different types of display data to different displays from a control unit, various cables/connectors are arranged between the control unit and each of the different displays. A cable adapted to convey signals between two units (such as a display and a control unit) has a first connector (e.g., a first set of connectors) adapted to connect to a first mating connector(s) of a first unit, a second connector (e.g., a second set of connectors) adapted to connect to a second mating connector(s) of a second unit, and a cable harness (e.g., flexible cable harness) having insulated wiring (or optical cables) arranged to electrically (or optically) couple signals (e.g., unidirectional and/or bidirectional signals) between the first and second connectors.

In an example, a system is adapted to selectively forward transmissions between serially chained devices. For example, the system can include a control unit coupled to a serial chain (e.g., one end of a serial chain) of display units. A multistream generator can be coupled to an output of the control unit, so that the example multistream generator can encode (e.g., encapsulate) video data from multiple streams into a format adaptable to different types of displays in the serial chain (e.g., daisy-chained displays). Sometimes, errors can occur in a communication circuit that transmits a data stream, such as including video. For example, an error in the communication circuit, or a communication link, sometimes results in video of the data stream becoming frozen and not updating on a display responsive to the underlying data represented by the video of the data stream changing. As used herein, a video stream may be a data stream that includes video or provides video to a display device.

As described herein, an apparatus is adapted to be inserted inline between a video stream source and a video stream destination. In some examples, the apparatus is inserted inline between a stream aggregator and a stream disaggregator, as described elsewhere herein. In other examples, the apparatus is inserted between a stream disaggregator and a display unit configured to display a portion of the video stream output by the stream disaggregator. The apparatus is configured to monitor a video stream transmitted between the video stream source, such as a processor, processing unit, graphics unit (e.g., graphic processing unit), or other component, and the video stream destination. The monitoring, in at least some examples, compares defined regions of the video stream across multiple frames of the video stream. For example, in some implementations a region(s) of interest of the video stream is user defined or is selected at random. The region(s) of interest is, in some examples, defined according to a pair of horizontal, or x-axis, coordinates and a pair of vertical, or y-axis, coordinates. For the region(s) of interest, data points are sampled at random over multiple frames of the video stream. After a programmed number of frames of the video stream are sampled, a next number of frames of the video stream are sampled in the same locations as were sampled in the programmed number of frames of the video stream. Sampled data from sampling the programmed number of frames of the video stream and the next number of frames of the video stream is compared. If the sampled data matches, the video stream is determined to be frozen. If the sampled data does not match, the video stream is deemed to be not frozen.

In at least some examples, if the video stream is frozen, the apparatus generates an error signal. The error signal is, in some examples, an interrupt signal configured to modify operation of the video stream destination based on existence of the error signal. In some implementations, responsive to the apparatus generating one error signal, operation of the video stream destination is modified. In other examples, the apparatus counts a number of generated error signals and, responsive to the number exceeding a threshold, operation of the video stream destination is modified. The threshold is, in some examples, programmed along with the region(s) of interest. In other examples, the threshold is provided at, or near, runtime by a user of the apparatus or a system including the apparatus. At least some examples of operation of the video stream destination being modified include the region(s) of interest being filled with a programmed symbol, shape, or group of colored pixels. Other examples of operation of the video stream destination being modified may include the video stream destination, or an individually addressable or controllable portion of the video stream destination, being reset or restarted.

Figure 1:
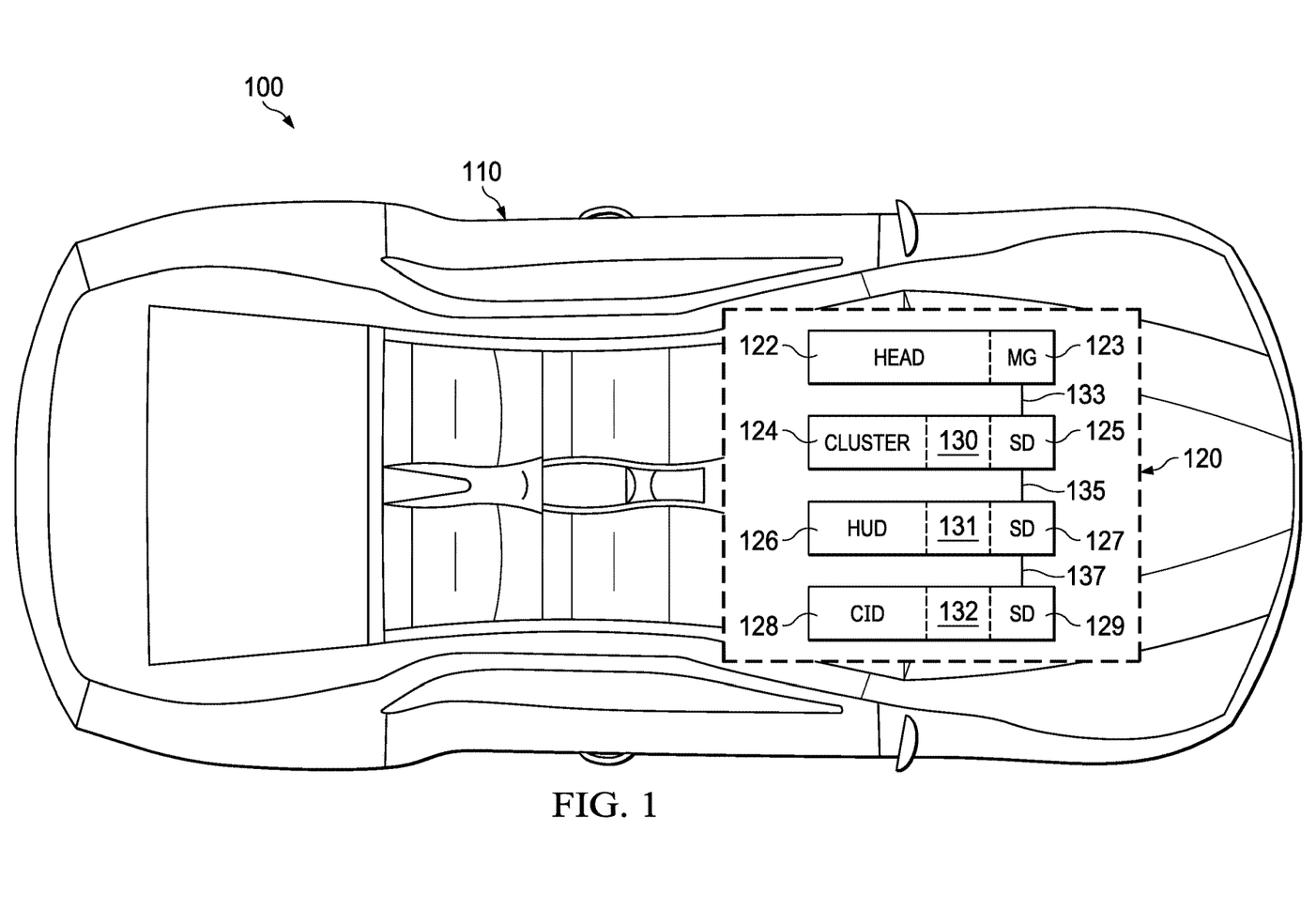
FIG. 1 is a diagram of a system adapted to selectively forward transmissions between serially chained devices of the system in accordance with various examples.

FIG. 1 is a diagram showing an example vehicle that includes a system 100 adapted to selectively forward transmissions between serially chained devices of the system 100. Generally described, the system 100 is an example system that includes a host vehicle 110. An example multiple display system 120 can be installed in the host vehicle 110. The example multiple display system 120 can include any number of displays in a serial chain, one end of which can be connected to a control unit.

An example multiple display system 120 can include a control unit (e.g., head unit 122), a first display (e.g., instrument cluster display CLUSTER 124), a second display (e.g., heads-up display HUD 126), and a third display (e.g., center-instrument display CID 128). The example multiple display system 120 can include one or more head units 122. A head unit 122 is adapted to receive sensor data (e.g., from cameras or instrumentation sensors) or other data (e.g., maps and/or GPS information) and generate video streams in response to this data. Each head unit 122 transmits at least one generated video stream, each of which is received by the multistream generator 123.

The multistream generator (MG) 123 can have an input (e.g., video input) coupled to (e.g., can be included by) the head unit 122 and can have an output coupled (e.g., via cable 133) to an input of the stream disaggregator 125. In an example, the multistream generator 123 can receive a video stream from a respective head unit 122. In some examples, the multistream generator 123 can receive a video stream from at least one head unit 122 (e.g., so that one or more video streams can be generated by a head unit 122 for stream aggregation by the multistream generator 123).

The stream disaggregator (SD) 125 can have a first output (e.g., local output) coupled to (e.g., can be included by) the display CLUSTER 124 and can have a second output (e.g., system output) coupled (e.g., via cable 135) to an input of the stream disaggregator 127.

The stream disaggregator 127 can have a first output (e.g., local output) coupled to (e.g., can be included by) the display HUD 126 and can have a second output (e.g., system output) coupled (e.g., via cable 137) to an input of the stream disaggregator 129.

The stream disaggregator 129 can have a first output (e.g., local output) coupled to (e.g., that can be included by) the display CID 128 and can have a second output (e.g., system output) optionally coupled (e.g., via another cable, not shown) to an input of an optional stream disaggregator (not shown) for display. Other stream disaggregators can be successively concatenated to the tail of the serial chain connecting the serially chained displays (e.g., where the tail of the serial chain is opposite to the end of the serial chain connected to the head unit 122).

The multistream generator 123 is arranged to encode high-resolution, real-time video data (including video-associated data) into a packet format. The multistream generator 123 can be arranged as a serializer (e.g., which is adapted to serially output video data, where the video data can be received asynchronously by the multistream generator 123 in a serial or parallel format) and/or can be arranged to output the video data in a parallel manner. Each packet can include an identifier (e.g., stream identifier) for identifying a particular video stream being encoded and/or for identifying a destination of the packet (e.g., identifying the display to which the packet is addressed). The identifier can be parsed by a stream disaggregator (e.g., any of the stream disaggregator 125, 127, and/or 129) in accordance with a mode (e.g., a default or programed configuration) associated with a respective stream disaggregator (e.g., any of the stream disaggregator 125, 127, and/or 129). Each packet is received by at least one stream disaggregator for forwarding (and/or decoding/deserializing).

A stream disaggregator (e.g., 125, 127, and/or 129) is arranged to receive the packet (e.g., which has an identifier for indicating a destination display) and to select between a stream disaggregator first output (e.g., a local output for coupling information to a locally coupled display) and a stream disaggregator second output (e.g., a system output for forwarding information to at least one other stream disaggregator).

In at least some implementations, a frozen image detector 130 is coupled between the stream disaggregator 125 and the display CLUSTER 124, a frozen image detector 131 is coupled between the stream disaggregator 127 and the display HUD 126, and/or a frozen image detector 132 is coupled between the stream disaggregator 129 and the display CID 128. For the sake of discussion herein, the frozen image detector 130 is discussed. However, in at least some examples the frozen image detector 131, the frozen image detector 132, and other frozen image detectors (not shown) coupled between other stream disaggregators and other serial chained displays operate substantially similar to the frozen image detector 130. In at least some implementations, the frozen image detector 130 intercepts or otherwise receives a video stream output by a first output of the stream disaggregator 125, and determines whether sampled portions of a specified region(s) of interest remain unchanged across multiple groups of frames of the video received by the frozen image detector 130 from the stream disaggregator 125. Based on a result of that comparison, the frozen image detector 130 determines whether the video received by the frozen image detector 130 from the stream disaggregator 125 is frozen and outputs video to the display CLUSTER 124. In some examples, the video output by the frozen image detector 130 to the display CLUSTER 124 is the same as video received by the frozen image detector 130 from the stream disaggregator 125. In other examples, the video output by the frozen image detector 130 to the display CLUSTER 124 is generated by the frozen image detector 130. In some implementations, the video output by the frozen image detector 130 indicates that a number of errors in the video received by the frozen image detector 130 from the stream disaggregator 125 has exceeded the programmed threshold. Operation of the frozen image detector 130 is further described below herein with reference to FIG. 3.

Figure 2:
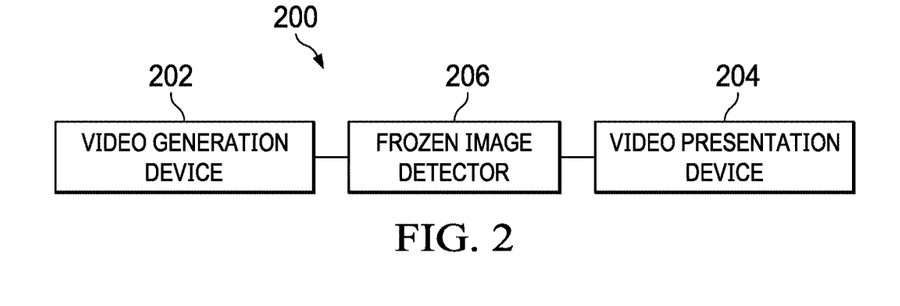
FIG. 2 is a diagram of a system for video distribution in accordance with various examples.

FIG. 2 is a diagram of an example system 200 for video distribution. Generally described, the system 200 is any system in which a video is generated, or received, and transmitted to a device for display or presentation.

In at least some examples, the system 200 includes a video generation device 202 and a video presentation device 204. The system 200 further includes a frozen image detector 206 coupled inline between the video generation device 202 and the video presentation device 204. The video generation device 202 is any device capable of generating a video stream, or a series of still image frames, the scope of which is not limited herein. The video presentation device 204 is any device capable of displaying or presenting a video stream, or a series of still image frames (e.g., approximating video or having the capability to show change over time of illustrated elements), the scope of which is not limited herein.

Examples of the video generation device 202 include a camera, a computing device, a processor, or any other device or component capable of generating video, or still images, in any manner and based on any input(s). Examples of the video presentation device 204 include a display screen (e.g., light emitting diode (LED), liquid crystal display (LCD), etc.), a projector, a touch screen, a large format display (e.g., multiple LEDs arranged into panels that are tiled to form a display), a vehicle heads-up display, a vehicle instrument cluster or dashboard display, or any other device or component capable of displaying or presenting video, or still images, in any manner regardless of a source of that video or those still images.

In at least some implementations, the frozen image detector 206 intercepts, parses, reads, or otherwise receives a video stream (or series of still images) output by the video generation device 202, and determines, based on a specified region(s) of interest, whether the video stream is frozen. Based on a result of that determination, the frozen image detector 206 outputs video to the video presentation device 204. In some examples, the video output by the frozen image detector 206 to the video presentation device 204 is the same as video received by the frozen image detector 206 from the video generation device 202. In other examples, the video output by the frozen image detector 206 to the video presentation device 204 is generated by the frozen image detector 206. In some implementations, the video output by the frozen image detector 206 indicates that a number of groups of frozen frames has exceeded the programmed threshold. Operation of the frozen image detector 206 is further described below herein with reference to FIG. 3.

While in some examples at least some of the video generation device 202, the video presentation device 204, and the frozen image detector 206 are implemented as physically separate devices, in other examples at least some of the video generation device 202, the video presentation device 204, and the frozen image detector 206 are implemented in a same device. For example, in at least one implementation the video generation device 202 is a processor of a computing device, the video presentation device 204 is a graphics card or display of the computing device, and the frozen image detector 206 is implemented within the computing device inline between the processor of the computing device and the graphics card or display of the computing device.

Figure 3:
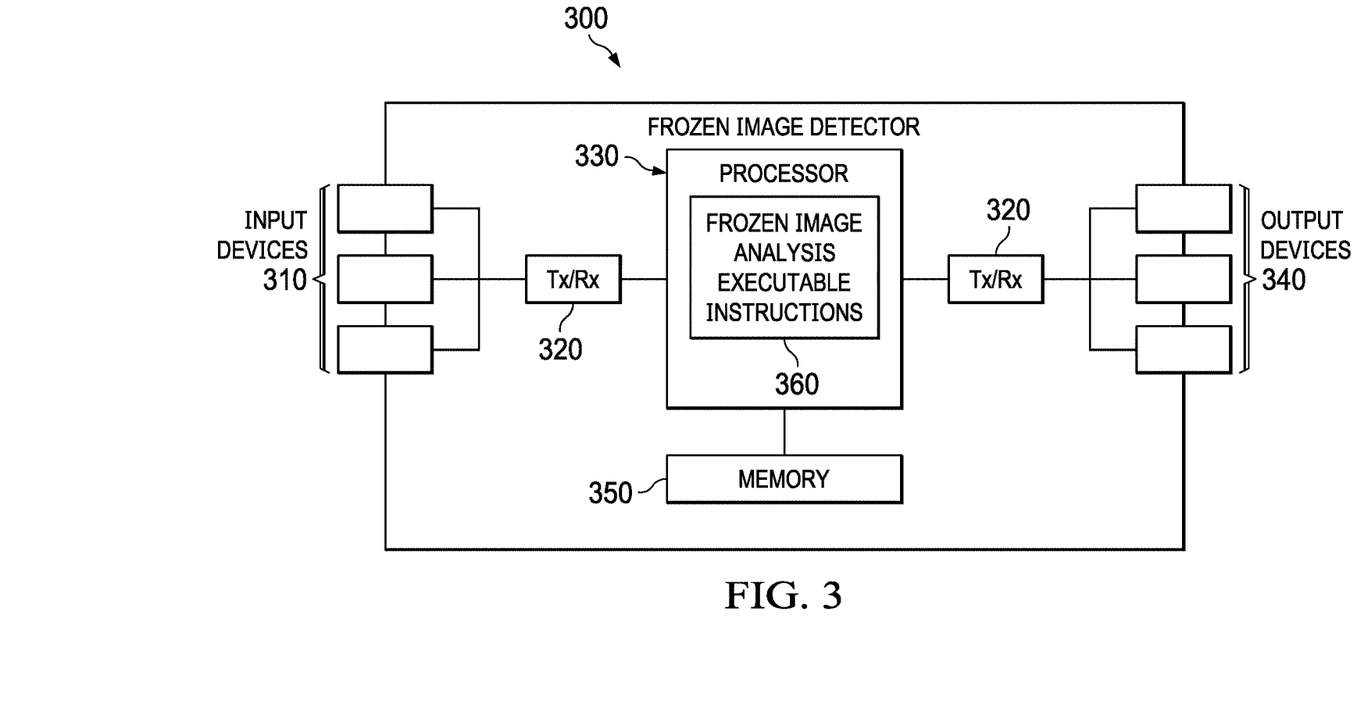
FIG. 3 is a diagram showing a frozen image detector in accordance with various examples.

FIG. 3 is a diagram showing an example frozen image detector 300 for determining whether a video stream is frozen. In at least some examples, the frozen image detector 300 is suitable for implementation as the frozen image detector 130, the frozen image detector 131, and/or the frozen image detector 132 of FIG. 1, and/or the frozen image detector 206 of FIG. 2. The frozen image detector 300, in some examples, receives video content (or still images) as input and provides video content (or still images) as output. For ease, as used herein, the term "video content" is intended to include both video content and still images. In some examples, the video content output by the frozen image detector 300 is the same as, or includes, the video content received by the frozen image detector 300. In other examples, the video content output by the frozen image detector 300 is generated by the frozen image detector 300 and does not include video content received by the frozen image detector 300. In yet other examples, the video content output by the frozen image detector 300 is video generated by the frozen image detector 300 and combined with the video content received by the frozen image detector 300.

In some examples, the frozen image detector 300 includes input devices 310. The input devices 310 include any connections, terminals, sensors, or other components that enable the frozen image detector 300 to receive video content. In some examples, at least some of the input devices 310 are downstream ports coupled to a transceiver (Tx/Rx) 320, which are transmitters, receivers, or combinations thereof. The Tx/Rx 320 transmits and/or receives data to and/or from other computing devices via at least some of the input devices 310. Similarly, the frozen image detector 300 includes a plurality of output devices 340. The output devices 340 include any connections, terminals, sensors, or other components that enable the frozen image detector 300 to transmit video content. In some examples, at least some of the input devices 310 are upstream ports coupled to a Tx/Rx 320. The Tx/Rx 320 transmits and/or receives data to and/or from other devices via at least some of the Tx/Rx 320. In various examples, the downstream ports and/or the upstream ports include electrical and/or optical transmitting and/or receiving components. In another example, the frozen image detector 300 includes antennas (not shown) coupled to the Tx/Rx 320. In some examples, the Tx/Rx 320 transmits and/or receives data from other devices wirelessly via the antennas. In yet other examples, the frozen image detector 300 includes additional Tx/Rx 320 such that the frozen image detector 300 has multiple networking or communication interfaces.

A processor 330 is coupled to the Tx/Rx 320 and at least some of the input devices 310 and/or output devices 340 and implements executable instructions to perform frozen image analysis (which may include image verification or analysis) as described herein, such as via frozen image analysis executable instructions 360. In an example, the processor 330 comprises multi-core processors and/or memory modules 350, which functions as data stores, buffers, etc. The processor 330 is implemented as a general processor or as part of application specific integrated circuits (ASICs), field-programmable gate arrays (FPGAs), and/or digital signal processors (DSPs). Although illustrated as a single processor, the processor 330 is not so limited and alternatively can include multiple processors.

FIG. 3 also illustrates that a memory module 350 is coupled to the processor 330 and is a non-transitory medium to store various types of data. Memory module 350 comprises memory devices such as read-only memory (ROM), random-access memory (RAM), hard drive, solid-state-drive, digital storage elements such as flip-flops, and/or flash memory. In some examples, the ROM is used to store instructions and perhaps data that are read during program execution. The ROM is a non-volatile memory device that has a small memory capacity relative to the larger memory capacity of other storage devices. In some examples, the RAM is used to store volatile data and perhaps to store instructions.

In some examples, the memory module 350 includes the instructions for carrying out the various examples described herein. For example, in some implementations the memory module 350 includes the frozen image analysis executable instructions 360, which are executed by processor 330.

It is understood that by programming and/or loading executable instructions onto the frozen image detector 300, at least one of the processor 330 and/or the memory module 350 are changed, transforming the frozen image detector 300 in part into a particular machine or apparatus, for example, a frozen image detector having the functionality taught by the present disclosure.

The frozen image analysis executable instructions 360 are configured to cause the frozen image detector 300 to compare specific portions of a region(s) of interest of multiple frames of received video content to determine whether those specific portions of the region(s) of interest change. For example, the frozen image detector 300 receives input from one or more users to program operational parameters of the frozen image detector 300. In various examples, the operational parameters include the region(s) of interest for received video content and/or a programmed threshold.

The region(s) of interest is, in some examples, received from a user as input defined in terms of cartesian coordinates in two or more dimensions (e.g., along an x-axis, y-axis, and/or z-axis). In other examples, the region(s) of interest is determined by the processor 330. The programmed threshold is, in some examples, a threshold number of sequentially frozen frames of the received video before the frozen image detector 300 triggers an action responsive to the frozen frames.

In operation, the frozen image detector 300 receives video content from another device via the input devices 310. In some examples, the frozen image detector 300, via the processor 330, transmits the received video content to another device, such as a display or presentation device, via the output devices 340. In at least some examples, prior to, or simultaneous with, transmitting the received video content to the another device, the processor 330 analyzes the received video content according to the frozen image analysis executable instructions 360. The frozen image analysis executable instructions 360 cause the processor 330 to sample the received video content within the region(s) of interest for multiple sequential video frames (or still images). Any suitable number of sequential video frames (or still images) are sampled, the scope of which is not limited herein. In at least some examples, sixty-four (or any other suitable number of) sequential video frames are sampled. In some examples, the sample is of randomly selected pixels or locations within the region(s) of interest for each sampled video frame. The random selection is performed, in at least some examples, based on a pseudorandom binary sequence counter or generator. In some examples, the random selection is determined by the processor 330 according to a fuzzy-sampling process. Sampling of the received video content, in at least some examples, results in generation or detection of a sampled value for each sampled video frame of the received video content. The sampled values are, in some examples, stored in registers of the processor 330. In other examples, the sampled values are stored in the memory module 350. After sampling the randomly selected pixels or locations within the region(s) of interest over the multiple sequential video frames, the same pixels or locations within the region(s) of interest are sampled over a second number of sequential video frames. The second sampled values are, in some examples, stored in registers of the processor 330. In other examples, the second sampled values are stored in the memory module 350.

The processor 330 further compares the sampled values to the second sampled values. For each sampled value and second sampled value corresponding to the same pixels or locations within the region(s) of interest, if the comparison reveals no change between the sampled data, the processor 330 increments a frozen frame counter. If a value of the counter of frozen frames exceeds the programmed threshold, the processor 330 modifies an output of the frozen image detector 300. In some examples, modifying the output of the frozen image detector 300 includes generating video content and overlaying the received video content with the generated video content to form composite video content prior to transmitting the composite video content via the output devices 340. In other examples, modifying the output of the frozen image detector 300 includes generating video content transmitting the generated video content, instead of and in place of the received video content, via the output devices 340. In at least some examples, the frozen image detector 300 further transmits a notification to another device or component if the value of the counter of detected frozen frames exceeds the programmed threshold. In some examples, the processor 330 issues an interrupt responsive to the value of the counter of detected frozen frames exceeds the programmed threshold and the output of the frozen image detector 300 is modified, in some examples by the processor 330, responsive to issuance of the interrupt.

Figure 4:
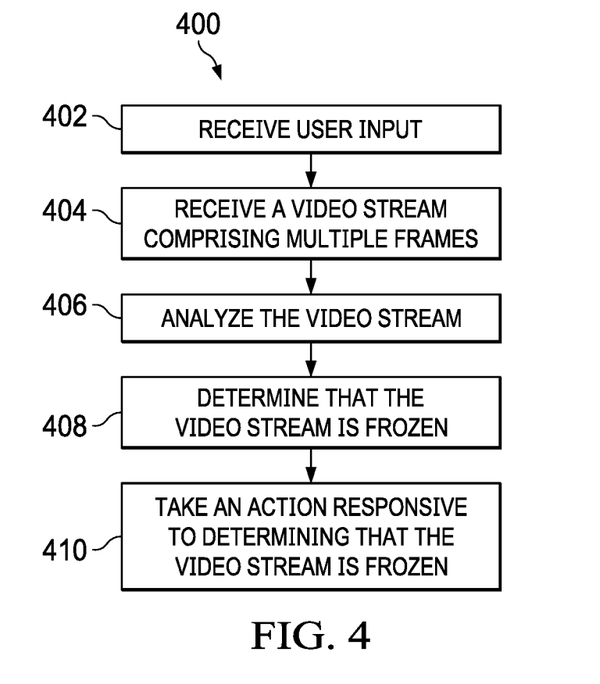
FIG. 4 is a flowchart of a method in accordance with various examples.

FIG. 4 is a flowchart of an example method 400 for frozen image analysis. In at least some examples, the method 400 is implemented by a video verifier, such as the frozen image detector 300 of FIG. 3, or another processing device having functionality similar to, or including, that of the frozen image detector 300. The method 400 is implemented to, in some examples, determine whether differences exist in randomly selected portions of temporally separated frames in a video stream.

At operation 402, user input is received. The user input is, in some examples, values for use in determining whether a video stream is frozen. For example, the user input includes a region(s) of interest for the video stream and/or a programmed threshold, as described above herein. In some example embodiments, the user input can include information/data stored in memory during manufacturing/testing of the system. In other embodiments, the user input may include information/data uploaded to the system via memory uploads or other types of uploads (wireless or wired) by the system (e.g., vehicle) manufacturer.

At operation 404, a video stream comprising multiple frames is received. The video stream is received from any suitable source, such as a vehicle head unit, another computing device in a vehicle, a processor, a camera, or any other suitable device capable of providing the video stream.

At operation 406, the video stream is analyzed. For example, the video stream is analyzed to determine a data value representing an image pixel at randomly selected location(s) in a first of the frames. The location(s) are, in at least some examples, within the region(s) of interest received at operation 402. Subsequently, a data value representing an image pixel at another, or other randomly selected location(s) in a second, and multiple subsequent, of the frames is determined. The data values representing the image pixel at the randomly selected location(s) in the first of the frames is compared to the data value representing the image pixel at the another randomly selected location(s) in the second of the frames. If the data values are deemed not to match, the method 400 returns to operation 404 and receives additional frames of the video stream for analysis. If the data values are deemed to match, the method 400 proceeds to operation 408.

At operation 408, a determination is made that the video stream is frozen. For example, the determination that the video stream is frozen is made if the data values representing the image pixel at the randomly selected location(s) in the first of the frames are the same as the data values representing the image pixel at the same randomly selected location (s) in the second of the frames. In other examples, the determination that the video stream is frozen is made if the data values representing the image pixel at the randomly selected location(s) are the same in a number of temporally separated sequential frames and the number of the frames exceeds a programmed threshold At operation 410, an action is taken responsive to determining that the video stream is frozen. The action is, in some examples, one or more of resetting the video stream (or a component generating the video stream), modifying the video stream, and/or generating an interrupt signal indicating that the video stream is frozen. In at least some examples, the modification of the video stream includes blacking out or blanking the video stream.

While the operations of the method 400 described herein have been described and labeled with numerical reference, in various examples, the method 400 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (e.g., in a reverse order, substantially simultaneously, overlapping, etc.). Each of these alternatives falls within the scope of the present description.

Figure 5:
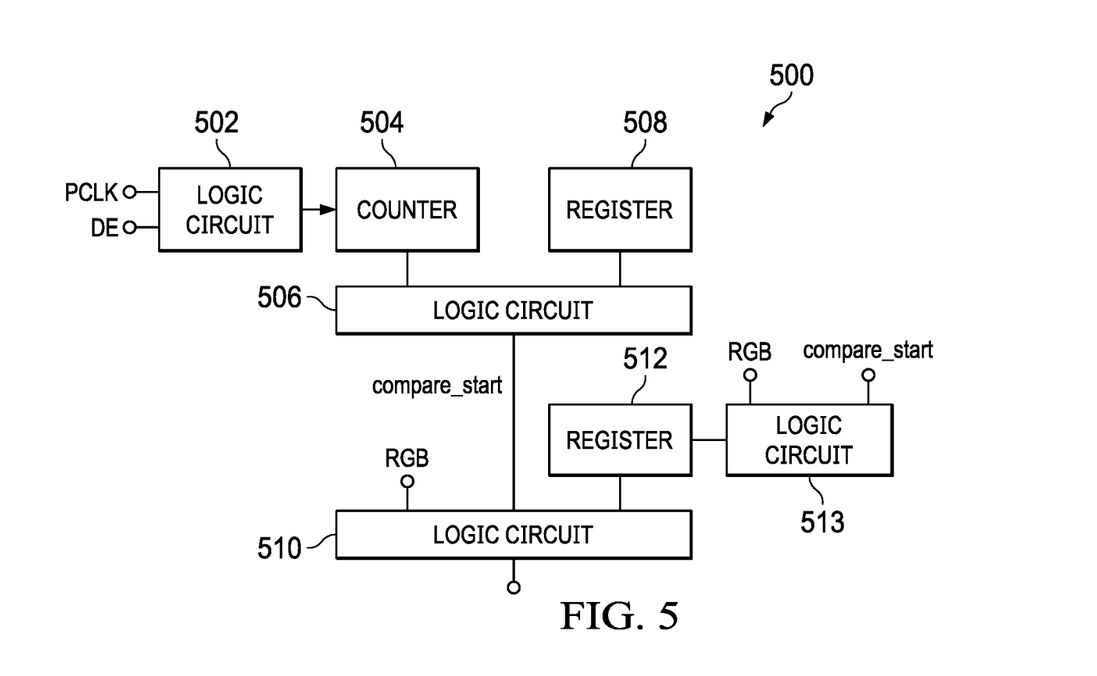
FIG. 5 is a diagram showing a frozen image detector in accordance with various examples.

FIG. 5 is a diagram showing an example frozen image detector 500 for verifying accuracy of video. In at least some examples, the frozen image detector 500 is suitable for implementation as the frozen image detector 130, the frozen image detector 131, and/or the frozen image detector 132 of FIG. 1 and/or the frozen image detector 206 of FIG. 2. In at least some examples, while the frozen image detector 300 of FIG. 3 performed frozen image detection based on a software implementation, the frozen image detector 500 performs frozen image detection based on a hardware implementation. In some use cases, a hardware implementation has certain benefits over a software implementation, such as increased speed, decreased size of implementation, etc. In other examples, the software implementation has certain benefits over the hardware implementation, such as flexibility, ability to reprogram and change, etc.

The frozen image detector 500, in some examples, receives video content as input and provides a frozen image determination of "pass" or "fail." In at least some examples, a determination of "pass" indicates that data for a sampled or checked region of the received content is not frozen. Similarly, in at least some examples, a determination of "fail" indicates that data for the sampled or checked region of the received content is frozen (e.g., has not changed in a programmed number of frames). In some implementations of the frozen image detector 500, the frozen image determination of "pass" is provided by the frozen image detector 500 providing an output signal having an asserted value. Similarly, a frozen image determination of "fail" may be provided by the frozen image detector 500 providing an output signal having a de-asserted value. In at least some examples, the frozen image detector 500 provides the frozen image determination to another device (not shown) that performs further actions based on the frozen image determination. In some implementations, the frozen image detector 500 provides the frozen image determination to a processor, such as a vehicle head unit or other processor, that modifies one or more visual presentations to a user based on the frozen image determination. For example, if the frozen image determination is fail, in some implementations, responsive to receipt of the frozen image determination, the processor modifies or augments an image presented to a user to indicate that the image is not reliable and/or accurate (e.g., the image is, or may be, frozen). Such an indication or visual output cue can include changing a color of the image, overlaying other graphics on top of the image, replacing the image, etc. In other examples, if the frozen image determination is fail, in some implementations, responsive to receipt of the frozen image determination, the processor may restart one or more components in an attempt to resolve the frozen image.

In at least some examples, the frozen image detector 500 includes a logic circuit 502, a counter 504, a logic circuit 506, a register 508, a logic circuit 510, and a register 512. In at least one implementation of the frozen image detector 500, the logic circuit 502 is configured to receive a pixel clock (PCLK) and a display enable signal (DE). An output signal of the logic circuit 502 is provided to the counter 504, and an output signal of the counter 504 is provided to the logic circuit 506. The logic circuit 506 is also configured to receive an input signal from the register 508. The logic circuit 506 provides an output signal to the logic circuit 510. The logic circuit 510 is also configured to receive current image pixel (RGB) data for verification and receive previous RGB data from the register 512.

In at least some examples, the logic circuit 502 is a circuit capable of performing a logical AND operation, such as an AND digital logic gate or other digital or analog circuitry suitable for providing similar functionality. The logic circuit 506 may be a circuit capable of performing logical comparisons, such as a circuit capable of performing an XNOR operation. For example, the logic circuit 506 may be one or more XNOR digital logic gates or other digital or analog circuitry suitable for providing similar functionality. The logic circuit 510 may be a circuit capable of performing logical comparisons, such as a circuit capable of performing an XNOR operation. For example, the logic circuit 510 may be one or more XNOR digital logic gates or other digital or analog circuitry suitable for providing similar functionality. While single signal lines are shown between components of the frozen image detector 500, in some implementations at least some of the signal lines are repeated and/or are buses such that multiple bits of data are transmitted and/or received in parallel to facilitate processing in parallel.

In an example of operation of the frozen image detector 500, the logic circuit 502 provides an output signal having an asserted value responsive to both PCLK and DE having asserted values. Otherwise, the logic circuit 502 provides the output signal having a de-asserted value. In at least some examples, PCLK is a periodic signal such that the output signal of the logic circuit 502 may also be a periodic signal. As described above, the frozen image detector 500 may determine whether an image represented by the RGB data is frozen for a region(s) of interest. The region(s) of interest may be defined by cartesian coordinates, vertically along a y-axis and horizontally along an x-axis. For example, DE may have an asserted value while the RGB data received by the frozen image detector 500 is from a line (e.g., a row of pixels along the x-axis having a singular y-axis value) that is within the region(s) of interest. In at least some examples, the region(s) of interest may be a single pixel of the RGB data. In other examples, the region(s) of interest may be multiple pixels of the RGB data. Responsive to both DE being asserted and PCLK being asserted, the logic circuit 502 provides an output signal having an asserted value and the counter 504 increments an internally stored count. The counter 504 may increment the internally stored count, in at least some examples, responsive to each signal edge (e.g., rising or falling) in the output signal of the logic circuit 502. The internally stored count is, in some examples, representative of a particular pixel of the RGB data within a given line. Although not shown in FIG. 5, in at least some examples, the counter 504 may be reset responsive to DE having a de-asserted value and may be permitted to count (e.g., not held in a reset state) responsive to DE having an asserted value. In other examples, the counter 504 may be reset based on, or according to, any suitable signal.

The logic circuit 506 may compare an output of the counter 504 to a value received from the register 508. The value received from the register 508 is, in at least some examples, a programmed value that represents a bound of the region(s) of interest. In other examples, the value received from the register 508 is a randomly selected and stored value that represents a bound of the region(s) of interest. In at least some examples, the frozen image detector 500 includes multiple registers 508, where each register 508 includes an x-axis value representative of a corner or vertices of the region(s) of interest. In some implementations, the register 508 may instead be replaced by a component (not shown) that determines and/or provides the randomly selected value that represents the bound of the region(s) of interest. For example, such a component may generate and provide a random value in substantially real-time, such as a number generator, pseudorandom number generator, etc. The logic circuit 506 may provide an output signal (e.g., compare_start) having an asserted value responsive to the output of the counter 504 having a same value as received from the register 508 and may provide compare_start having a de-asserted value otherwise. For example, a region(s) of interest may be defined by points y1,x1; y1,x2; y2,x1; and y2,x2. Responsive to RGB corresponding to a line in the range of [y1:y2], DE may have an asserted value. Responsive to an output of the counter 504 having a value in the range of [x1:x2], compare_start may have an asserted value. In at least some examples, y1 and y2 may have a same value. Similarly, in some examples, x1 and x2 may have a same value.

Responsive to compare_start having an asserted value, the logic circuit 510 may compare RGB to an output of the register 512. As described above, the register 512 may store a previous pixel of the RGB data. For example, although not illustrated, in at least one implementation the register 512 may be a flip-flop that is clocked according to PCLK and receives and stores the RGB data. In at least some examples, the frozen image detector 500 also includes a logic circuit 513. The logic circuit 513 may be a circuit suitable for performing an AND logical operation. In at least some examples, the logic circuit 513 receives RGB and compare_start and provides an output to the register 512 such that the register 512 receives the RGB data responsive to the RGB data being within the region(s) of interest. In this way, the logic circuit 510 may receive current RGB data while also receiving immediately preceding RGB data from the register 512. In at least some examples, the frozen image detector 500 includes multiple registers 512, where each register 512 includes data representative of a respective immediately preceding pixel of RGB such that multiple pixels of RGB may be checked or verified. Responsive to a value received from the register 512 having a same value as RGB for a particular pixel of received image data (e.g., while compare_start is asserted), the logic circuit 510 may provide an asserted output signal to indicate that the RGB data is, or is possibly, frozen. Otherwise, the output signal of the logic circuit 510 may have a de-asserted value indicating that the RGB data is not, or is likely not, frozen. In at least some examples, the register 512 may include multiple flip-flops coupled in series, each clocked by PCLK, such that a delay is implemented by the register 512. In such an example, the logic circuit 510 may receive current RGB data while also receiving prior or historical RGB data, where an age of the RGB data (e.g., how old the RGB data is) from the register 512 is determined according to the number of flip-flops coupled in series in the register 512.

Although not shown in FIG. 5, in at least some examples, the frozen image detector 500 includes a degree of fault tolerance. For example, some implementations of the frozen image detector 500 include a counter configured to count a number of consecutive instances of "fail" in the output of the logic circuit 510, where the counter may be reset responsive to an instance of "pass" in the output of the logic circuit 510. If the number of consecutive instances of "fail" in the output signal of the logic circuit 510 exceeds a programmed number, the counter may provide an asserted signal to indicate that the RGB data is, or is possibly, frozen. Alternatively, in some examples a device receiving the output signal of the logic circuit 510 implements the fault tolerance, such as by not acting responsive to the output signal of the logic circuit 510 indicating a failure until a consecutive number of the failures exceeds the programmed number. Some other implementations of the frozen image detector 500 include a counter configured to count a number of instances of "fail" in the output of the logic circuit 510. If the number of instances of "fail" in the output signal of the logic circuit 510 exceeds a programmed number, the counter may provide an asserted signal to indicate that the RGB data is, or is possibly, frozen. Alternatively, in some examples a device receiving the output signal of the logic circuit 510 implements the fault tolerance, such as by not acting responsive to the output signal of the logic circuit 510 indicating a failure until a number of the failures exceeds the programmed number.

Based on a determination that the RGB data is frozen, various actions may be performed. For example, an interrupt may be issued, a visual output cue or indicator may be provided to a user (e.g., an overlay over the frozen RGB data, a change in color of the RGB data, etc.)

At least some aspects of this description may be further understood with reference to, and may incorporate aspects of, U.S. patent application Ser. No. 17/245,336, filed on Apr. 30, 2021 and titled "Video Accuracy Verification," which is incorporated herein by reference in its entirety.

In the foregoing discussion and in the claims, the terms "including" and "comprising" are used in an open-ended fashion, and thus mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. Circuits described herein are reconfigurable to include the replaced components to provide functionality at least partially similar to functionality available prior to the component replacement.

Modifications are possible in the described examples, and other examples are possible within the scope of the claims.

What is claimed is:

1. A system, comprising:
   a head unit adapted to generate at least two video streams each comprising multiple frames;
   a multistream generator coupled to the head unit and configured to generate an output of the multistream generator having encoded packets that include information from the at least two video streams; and
   a frozen image detector configured to:
      receive the output of the multistream generator;
      analyze the output of the multistream generator to compare data values representing an image pixel at a specified location in a first of the frames to data values representing an image pixel at the specified location in a second of the image frames; and
      determine that at least one of the video streams is frozen responsive to the data values representing the image pixel at the specified location in the first of the frames being the same as the data values representing the image pixel at the specified location in the second of the image frames; and
   further comprising:
      a first stream disaggregator having a first stream input configured to receive the output of the multistream generator, the first stream disaggregator having a first output configured to couple to a first display to display a first of the video streams, and the first stream disaggregator having a second output configured to forward the output of the multistream generator; and
      a second stream disaggregator having a second stream input coupled to the second output of the first stream disaggregator, the second stream disaggregator having a first output configured to couple to a second display to display a second of the video streams.

2. The system of claim 1, wherein responsive to determining that at least one of the video streams is frozen, the frozen image detector is further configured to modify the output of the multistream generator prior to receipt of the output of the multistream generator by the first stream disaggregator.

3. The system of claim 1, wherein responsive to determining that at least one of the video streams is frozen, the frozen image detector is further configured to generate and output an interrupt indicating that at least one of the video streams is frozen.

4. The system of claim 3, wherein one of the first stream disaggregator or the second stream disaggregator is further configured to modify an output based on the interrupt.

5. The system of claim 1 further comprising a processor wherein the processor is coupled to the frozen image detector.

6. The system of claim 5, wherein the processor is further configured to act responsive to determining that at least one of the video streams is frozen.

7. The system of claim 6, wherein the action comprises generating an interrupt.

8. The system of claim 6, wherein the action comprises generating a visual output cue indicating the determination that the video is frozen.

9. The system of claim 6, wherein the action comprises overwriting at least a portion of the image frames.

10. The system of claim 5, wherein the specified location is determined by the processor according to fuzzy-sampling.

11. The system of claim 5, wherein the specified location is received by the processor as input specifying horizontal and vertical coordinates defining a region and input specifying a number of image pixels within the region for comparison.

12. The circuit of claim 5, wherein the processor is further configured to:
    compare data values representing image pixels at multiple locations in a first of the image frames to data values representing the image pixels at the locations in a second of the image frames; and
    determine that the video is frozen responsive to the data values for a programmed threshold number of the image pixels at the locations in the first of the image frames being the same as the data values for the programmed threshold number of the image pixel at the locations in the second of the image frames.

13. The circuit of claim 5, wherein the processor is further configured to determine that the video is frozen responsive to the data values representing the image pixel at the specified location in a number of the image frames being the same as the data values representing the image pixel at the specified location in the number of the image frames and the number of the image frames exceeds a programmed threshold.

* * * * *